United States Patent
Yamamoto (10) Patent No.: US 7,207,619 B2
(45) Date of Patent: Apr. 24, 2007

(54) CHILD SEAT TETHER ANCHOR STRUCTURE

(75) Inventor: Yoichi Yamamoto, West Bloomfield, MI (US)

(73) Assignee: Nissan Technical Center North America, Inc. MI (US)

( * ) Notice: Subject to any disclaimer, the term of this patent is extended or adjusted under 35 U.S.C. 154(b) by 470 days.

(21) Appl. No.: 10/809,695

(22) Filed: Mar. 26, 2004

(65) Prior Publication Data

US 2005/0212321 A1   Sep. 29, 2005

(51) Int. Cl.
*B60N 2/015* (2006.01)

(52) U.S. Cl. .................... 296/68.1; 296/63; 296/65.03; 280/801.2; 297/253

(58) Field of Classification Search .......... 296/187.08, 296/193.07, 63, 68.1, 65.02, 65.03; 280/801.2, 280/801.1; 297/253, 250.1
See application file for complete search history.

(56) References Cited

U.S. PATENT DOCUMENTS

| | | | | |
|---|---|---|---|---|
| 3,207,552 A | * | 9/1965 | Loughney, Jr. ............... | 297/37 |
| 5,671,948 A | * | 9/1997 | Susko et al. ............. | 280/801.1 |
| 5,941,600 A | * | 8/1999 | Mar et al. ................. | 297/250.1 |
| 6,234,572 B1 | * | 5/2001 | Shiino et al. ............... | 297/253 |
| 6,485,055 B1 | | 11/2002 | Swayne et al. | |
| 6,499,786 B2 | | 12/2002 | Takahashi | |
| 6,631,958 B1 | * | 10/2003 | Herrmann et al. ........ | 297/463.1 |
| 6,767,057 B2 | * | 7/2004 | Neelis ......................... | 297/253 |
| 6,932,407 B2 | * | 8/2005 | Cuerrier et al. ............... | 296/63 |
| 2002/0043839 A1 | * | 4/2002 | Hirota ......................... | 297/253 |
| 2004/0080195 A1 | * | 4/2004 | Adams et al. .............. | 297/253 |
| 2005/0121956 A1 | * | 6/2005 | Dolan et al. ................. | 297/253 |
| 2005/0127645 A1 | * | 6/2005 | Smith et al. ............. | 280/730.2 |
| 2006/0006713 A1 | * | 1/2006 | Patterson et al. ........ | 297/250.1 |
| 2006/0049622 A1 | * | 3/2006 | Yamamoto ............... | 280/801.1 |

OTHER PUBLICATIONS

Prior Art Sketch by Yoichi Yamamoto of a product available before Mar. 26, 2004.

* cited by examiner

*Primary Examiner*—Jason Morrow
(74) *Attorney, Agent, or Firm*—Global IP Counselors (57) ABSTRACT

Basically, a child seat tether anchor structures has a first end tether anchor, a second end tether anchor, an intermediate tether anchor, an anchoring tether, and a vehicle body mounting member with a height adjustment arrangement. In the illustrated embodiment, the vehicle child seat attachment structures are secured to both the vehicle body and the frame. Preferably, the vehicle child seat attachment structures are configured and arranged to move between a retracted position and an extended position. In the retracted position, the vehicle child seat attachment structures are covered by a carpet or other trim finishing material.

23 Claims, 7 Drawing Sheets

CHILD SEAT TETHER ANCHOR STRUCTURE

BACKGROUND OF THE INVENTION

1. Field of the Invention

The present invention generally relates to a vehicle child seat attachment structure for securing a vehicle child seat by a tether to an anchor structure formed on the vehicle body. More specifically, the present invention relates to a child seat tether anchor structure, which is integrated into a body panel of a vehicle.

2. Background Information

It is desirable to install a child seat on a vehicle seat when children ride in automobiles. Typically, the child seat is attached to the vehicle seat using one of the passenger seat belts. More recently, vehicles have been equipped with additional anchor points to comply with the ISOFIX type child system, which requires two lower child seat anchors and one tether anchor for securing the child seat to the vehicle at three locations. The two lower child seat anchors are coupled to latches provided at the bottom corners of the child seat, while the tether anchor is coupled to a tether that is attached to the upper end of the child seat. The lower child seat anchors are typically inverted U-shaped mounting members that are secured to a cross member of the floor panel that is located just behind the seat. One example of a plurality of lower child seat anchors is disclosed in U.S. Pat. No. 6,499,786. The tether anchor is typically secured to a cross member that is located rearwardly of the vehicle seat. The location of the tether anchor depends upon the construction of the vehicle. For example, a sport utility vehicle often has the tether anchor located on the cross member located at the rear hatch. An example of a tether anchor is disclosed in U.S. Pat. No. 6,485,055.

In view of the above, it will be apparent to those skilled in the art from this disclosure that there exists a need for an improved vehicle child seat tether anchor structure. This invention addresses this need in the art as well as other needs, which will become apparent to those skilled in the art from this disclosure.

SUMMARY OF THE INVENTION

The locations of tether anchors are often prescribed by regulations in many countries. Since tether anchors are not merely fixed to a body panel that is constructed of sheet metal structure, the vehicles are constructed with structural supports at the prescribed locations for the tether anchors. In other words, the prescribed locations of the tether anchors typically dictated the construction of the vehicle body to at least some extent. In particular, the tether anchor needs to be fixedly secured to a rigid support structure in which tether anchor will remain affixed in the event of a collision. Thus, if the vehicle body does not have any rigid support structure in the area where it is desirable to mount the tether anchor, then an additional rigid support structure must be added for securing the tether anchor at the prescribed location.

In view of the foregoing, one object of the present invention is to provide a child seat tether anchor structure that provides more flexibility in designing a vehicle.

Another object of the present invention is to provide a child seat tether anchor structure that reduces production costs and weight to provide tether anchors at a desirable location.

Yet another aspect of the present invention is to provide a child seat tether anchor structure that provides an attractive appearance for the vehicle when the tether anchor is not being used.

Moreover, another aspect of the present invention is to provide a child seat tether anchor structure that provides easy usage of the tether anchor.

In accordance with one aspect of the present invention, a child seat tether anchor structure is provided that basically comprises a first tether anchor, a vehicle body mounting member and a height adjustment arrangement. The vehicle body mounting member is configured and arranged to be coupled to a vehicle body. The height adjustment arrangement has a first height adjustment portion fixedly coupled to the first tether anchor and a second height adjustment portion fixedly coupled to the vehicle body mounting member. The first and second height adjustment portions are configured and arranged to selectively retain the first tether anchor in at least one of a first position relative to the vehicle body mounting member and a second position relative to the vehicle body mounting member.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
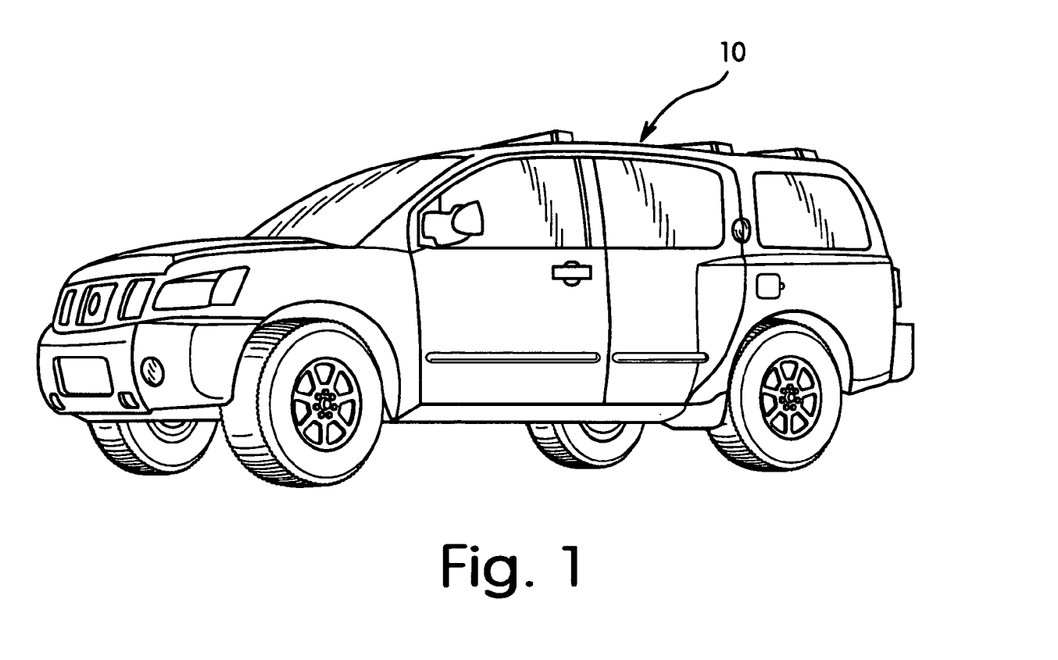
FIG. 1 is a side perspective view of a vehicle equipped with a child seat tether anchor structure in accordance with a preferred embodiment of the present invention.
Figure 2:
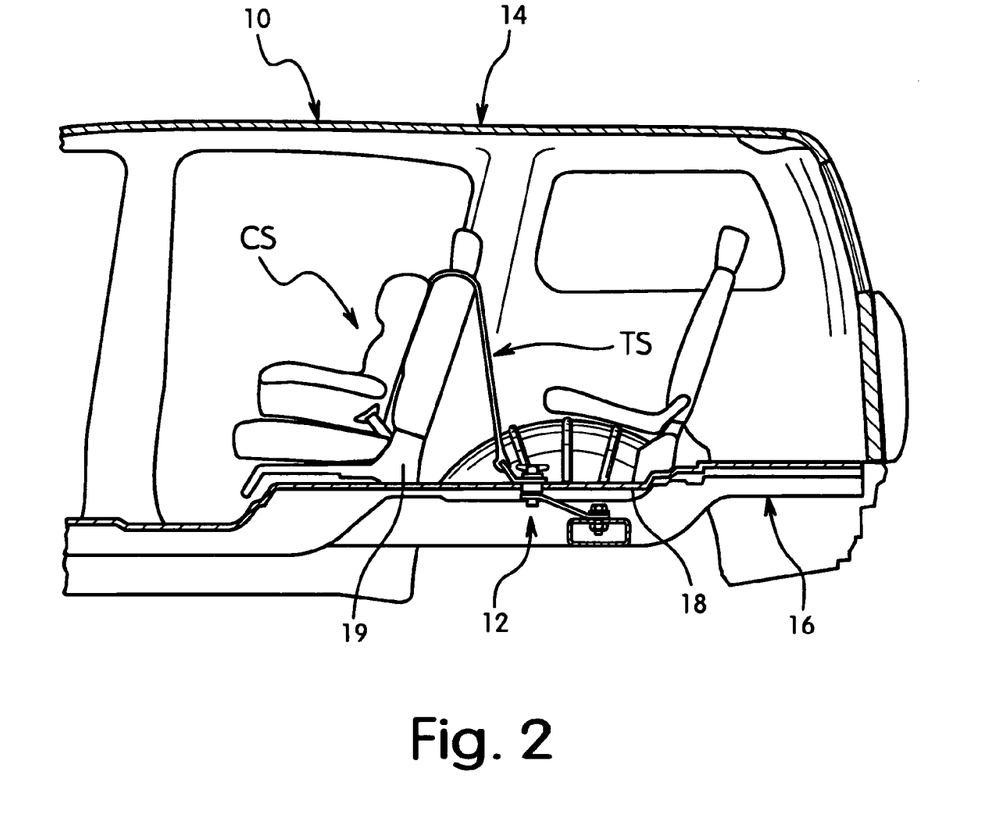
FIG. 2 is a simplified longitudinal view of a portion of the vehicle body for the vehicle illustrated in FIG. 1 to illustrated one of the child seat tether anchor structure in accordance with the present invention.
Figure 3:
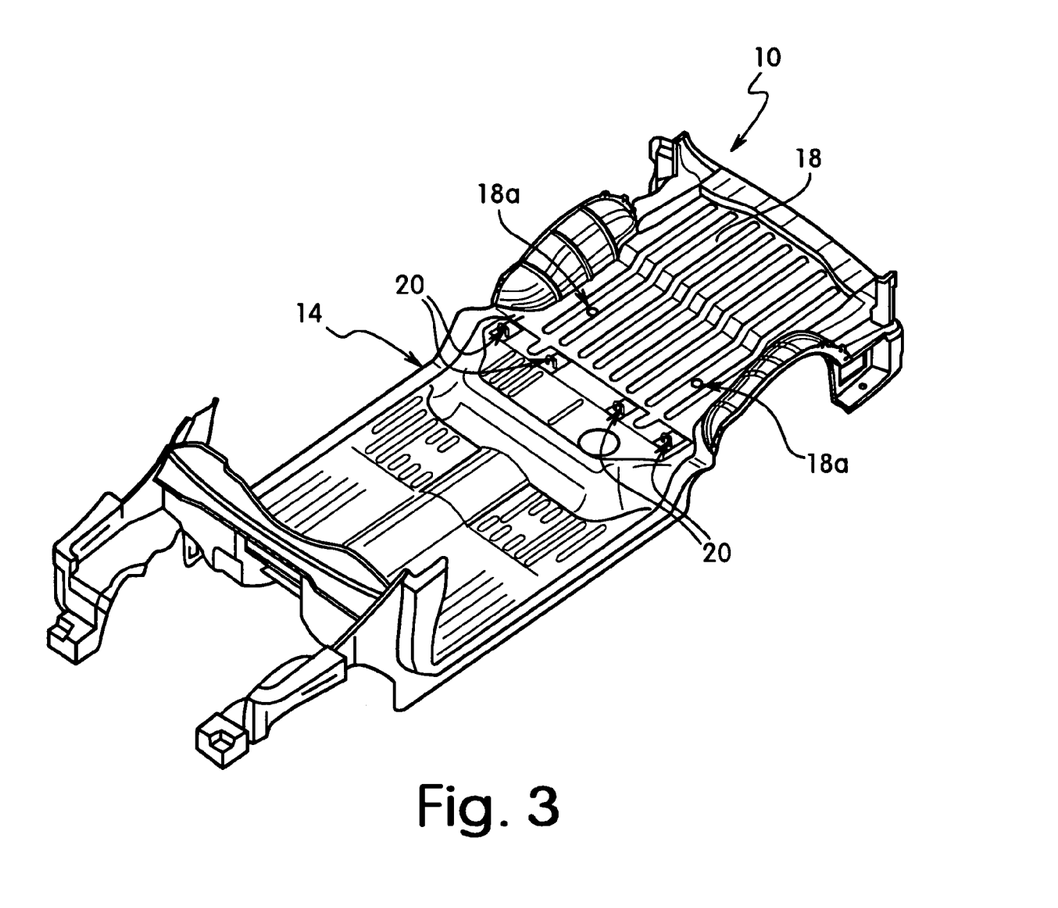
FIG. 3 is a simplified top perspective view of the floor structure of the vehicle body illustrated in FIGS. 1 and 2 with the child seat tether anchor structures removed.

Referring initially to FIGS. 1–3, a portion of a vehicle 10 is illustrated that is equipped with a pair of child seat tether anchor structures 12 in accordance with a preferred embodiment of the present invention. In installing a child seat CS in the vehicle 10, a tether TS of the child seat CS is clipped onto one of the child seat tether anchor structures 12. In the illustrated embodiment, the vehicle child seat attachment structures 12 are used with a vehicle body 14 mounted on a frame 16. However, it will be apparent to those skilled in the art from this disclosure that the vehicle child seat attachment structures 12 can be mounted on a uni-body type vehicle by securing the child seat attachment structures 12 to a structural support of the body instead of the frame 16 as discussed below.

Figure 4:
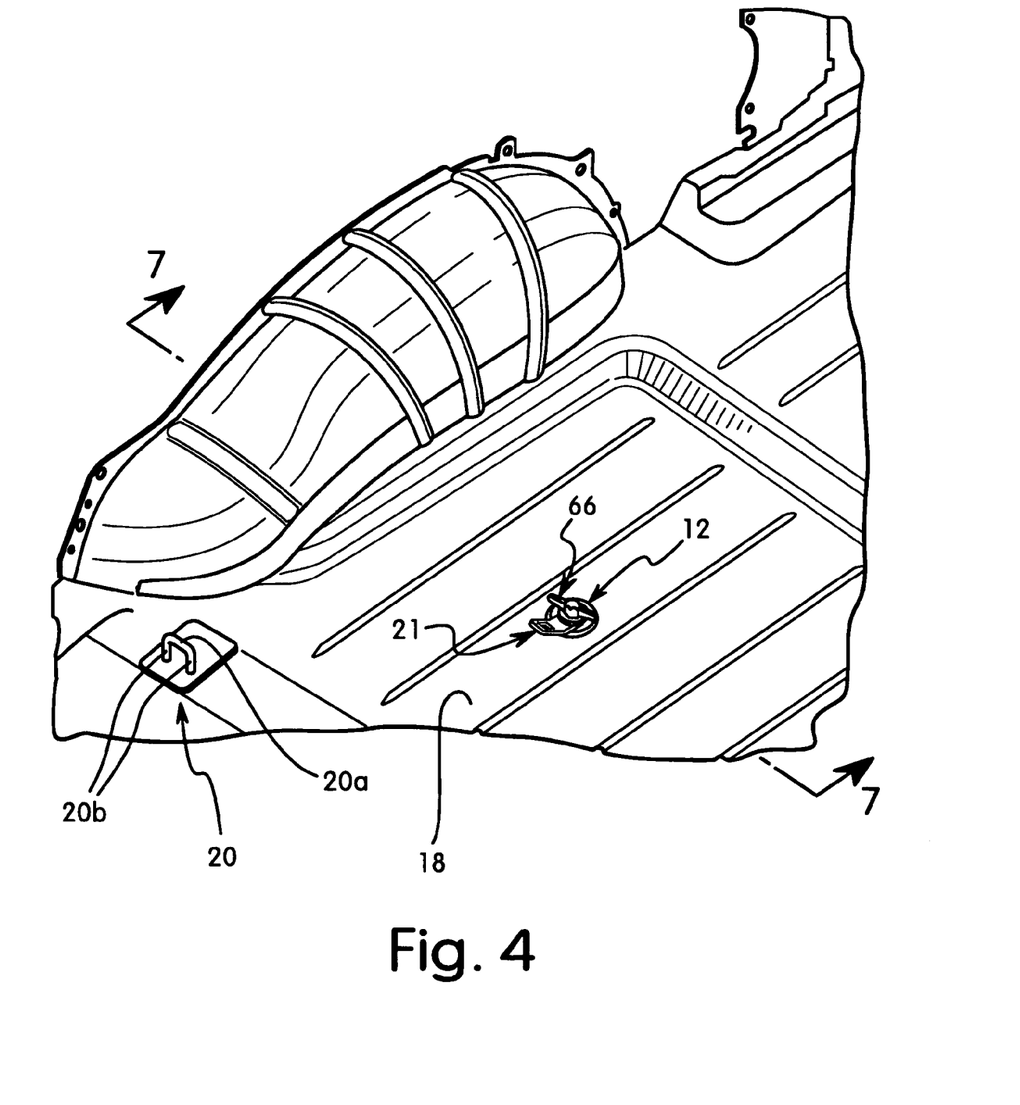
FIG. 4 is an enlarged partial top perspective view of the right side of the floor structure of the vehicle body illustrated in FIGS. 1–3 illustrating the right child seat tether anchor structure in accordance with the present invention.

The vehicle body 14 includes a body panel 18 that is preferably constructed of a sheet metal material. The body panel 18 is configured to form a floor of the vehicle body 14. The body panel 18 has a rear passenger seat 19 fixedly coupled to the upper surface of the body panel 18 in a conventional manner. As best seen in FIGS. 3 and 4, the area of the body panel 18 that is directly behind the rear passenger seat 19 preferably has a plurality of child seat anchors 20. The child seat anchors 20 are fixedly coupled thereto in a conventional manner. For example, one method of affixing child seat anchors is disclosed in U.S. Pat. No. 6,499,786, which is hereby incorporated entirely herein by reference. Of course, the child seat anchors 20 could be also directly attached to the rear passenger seat 19 in a conventional manner. However, in the illustrated embodiment, the child seat anchors 20 are attached to the body panel 18 and a laterally extending cross structural member (not shown) that is located beneath the body panel 18.

As best seen in FIG. 4, the child seat anchors 20 are preferably substantially inverted U-shaped attachment bars that extend upwardly from the body panel 18. Each of the child seat anchors 20 has a laterally extending cross bar portion 20a and a pair of leg portions 20b extending downwardly from the cross bar portion 20a to the body panel 18. Thus, the free ends of the leg portions 20b are fixedly coupled to the body panel 18. The cross bar portions 20a are configured and arranged to receive corresponding attachment structures of the child seat CS in a conventional manner.

Basically, each of the child seat tether anchor structures 12 comprises a first end tether anchor 21, a second end tether anchor 22, an intermediate tether anchor 23, an anchoring tether 24, a vehicle body mounting member 25 and a height adjustment arrangement 26. In the illustrated embodiment, the vehicle child seat attachment structures 12 are secured to both the vehicle body 14 and the frame 16. Preferably, the vehicle child seat attachment structures 12 are configured and arranged to move between an extended (in-use) position (FIG. 5) and a retracted (non-use) position (FIG. 6). In the retracted position (FIG. 6), the vehicle child seat attachment structures 12 are covered by a carpet or other trim finishing material 30. Of course, it will be apparent to those skilled in the art from this disclosure that the height adjustment arrangement 26 can be eliminated as mentioned below.

Figures 8, 9:
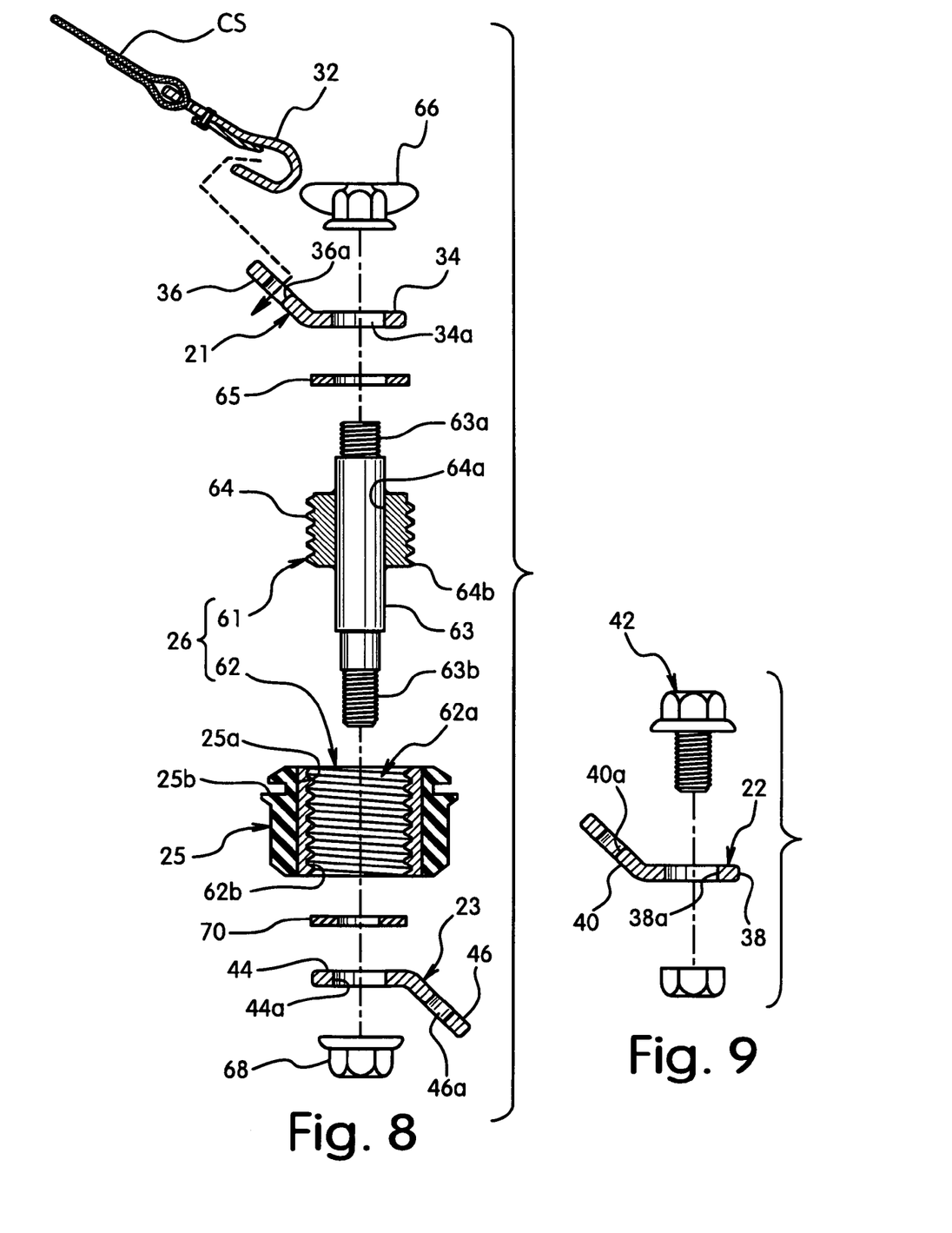
FIG. 8 is an exploded cross sectional view of selected parts of the vehicle child seat tether anchor in accordance with the present invention.
FIG. 9 is an exploded cross sectional view of selected parts of the vehicle child seat tether anchor in accordance with the present invention.

As best seen in FIG. 8, the first end tether anchor 21 is a rigid member that is constructed of a strong rigid material such as metal. Basically, the first end tether anchor 21 can have a conventional construction for securing the tether strap 16 of the child seat CS thereto via a clip 32. In particular, the first end tether anchor 21 basically has a mounting portion 34 with a mounting hole 34a and a tether connecting portion 36 with a tether connecting hole 36a. The first end tether anchor 21 is releasably coupled to the vehicle body mounting member 25 as explained below.

Figure 5:
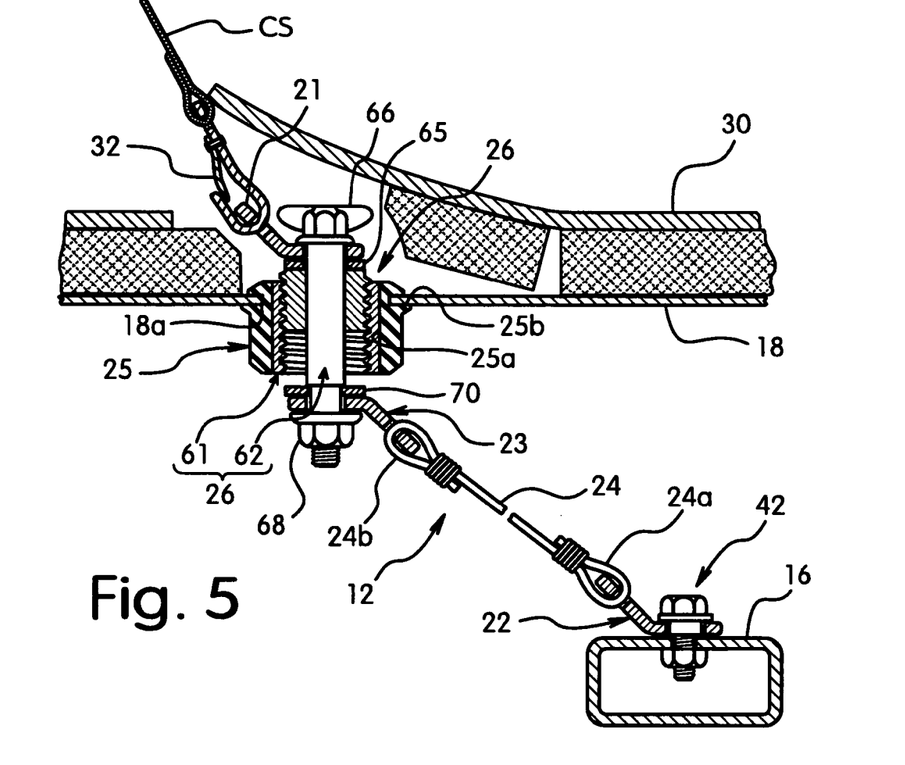
FIG. 5 is a simplified partial cross sectional view of the right side child seat tether anchor after the carpet has been installed and the child seat tether has been attached thereto.
Figure 6:
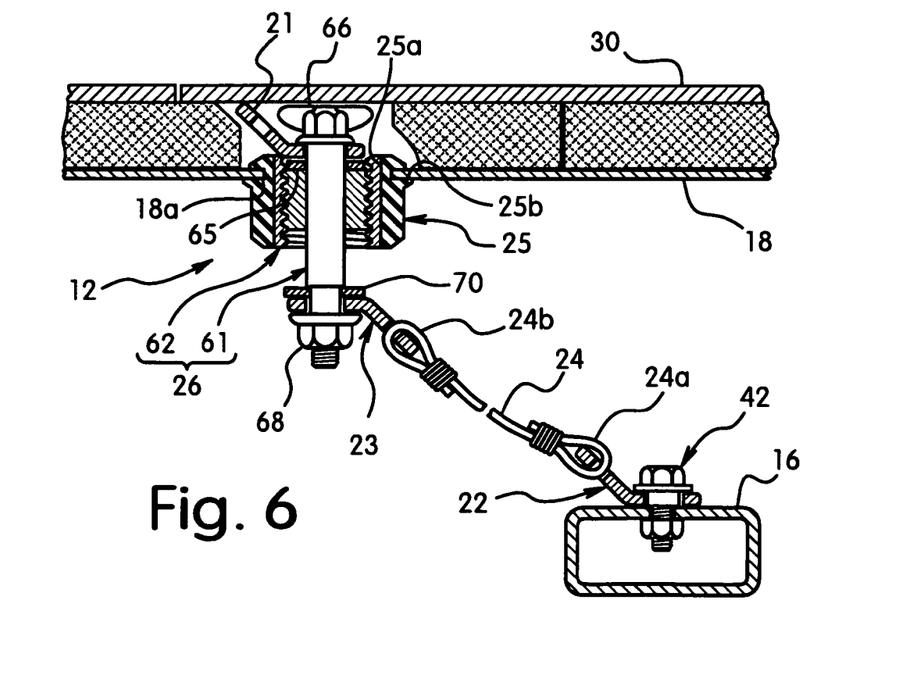
FIG. 6 is a simplified partial cross sectional view of the right side child seat tether anchor, corresponding to FIG. 5, but where the side child seat tether anchor has been retracted to non-use position.
Figure 7:
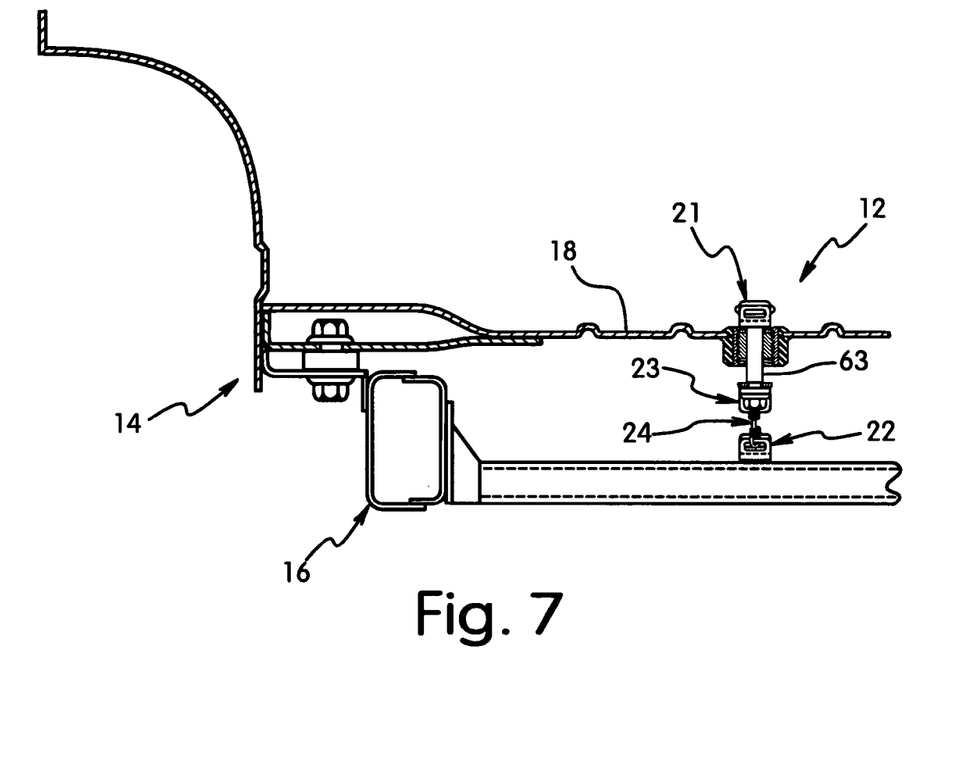
FIG. 7 is a simplified partial cross sectional view of the vehicle frame and vehicle body with the right side child seat tether anchor installed in the vehicle body in accordance with the present invention.

As best seen in FIGS. 5 and 6, the second end tether anchor 22 is remotely coupled to the first tether anchor 21 by the intermediate tether 23 and the anchor the anchoring tether 24 as explained below. The second end tether anchor 22 is a rigid member that is constructed of a strong rigid material such as metal. Preferably, the second end tether anchor 22 is identical in construction to the first end tether anchor 21 such that in is not necessary to produce a different part for the second end tether anchor 22. In any event, as best seen in FIG. 9, the second end tether anchor 22 basically has a mounting portion 38 with a mounting hole 38a and a tether connecting portion 40 with a tether connecting hole 40a. The second end tether anchor 22 is preferably coupled to the frame 16 (vehicle support structure) in a releasable manner via a fastener 42 (e.g., nut and bolt type fastener) as seen in FIGS. 5 and 6. Of course, it will be apparent those skilled in the art that the second end tether anchor 22 can be weld or riveted to the frame 16 if needed and/or desired.

Still referring to FIGS. 5 and 6, the intermediate tether anchor 23 is coupled to the first tether anchor 21 by the through the mounting member 25 as explained below. The intermediate tether anchor 23 is a rigid member that is constructed of a strong rigid material such as metal. Preferably, the intermediate tether anchor 23 is identical in construction to the first and second end tether anchors 21 and 22 such that in is not necessary to produce a different part for the intermediate tether anchor 23. In any event, as best seen in FIG. 8, the intermediate tether anchor 23 basically has a mounting portion 44 with a mounting hole 44a and a tether connecting portion 46 with a tether connecting hole 46a. The intermediate tether anchor 23 is preferably releasably coupled to the vehicle body mounting member 25 as explained below.

As seen in FIGS. 5 and 6, the anchoring tether 24 is preferably a wire or cable that is coupled between the second end tether anchor 22 and the intermediate tether anchor 23. In particular, the anchoring tether 24 has a first looped end 24a and a second looped end 24b. The first looped end 24a of the anchoring tether 24 is coupled to the tether connecting hole 40a of the second end tether anchor 22. The second looped end 24b of the anchoring tether 24 is coupled to the tether connecting hole 46a of the intermediate tether anchor 23.

The vehicle body mounting member 25 is configured and arranged to be fixedly coupled to the floor or body panel 18 of the vehicle body 14. Basically, the vehicle body mounting member 25 is fixedly coupled to the first and intermediate tether anchors 21 and 23 by the height adjustment arrangement 26. Preferably, the vehicle body mounting member 25 is preferably a rubber grommet that is secured to the body panel 18 of the vehicle body 14.

The vehicle body mounting member 25 is a tubular member having a center hole 25a extending in an axial direction and an annular groove 25b formed in its outer surface. The center hole 25a of the vehicle body mounting member 25 is dimension to receive a part of the height adjustment arrangement 26 therein. The vehicle body mounting member 25 is disposed in a hole 18a of the body panel 18 of the vehicle body 14 such that edge of the body panel 18 that defines the hole 18a is disposed in the annular groove 25b. Thus, the vehicle body mounting member 25 is designed for easily installing and removing the child seat tether anchor structure 12 to the body panel 18 of the vehicle body 14. The vehicle body mounting member 25 and the hole 18a of the body panel 18 are dimensioned such that the vehicle body mounting member 25 does not rotate within the hole 18a of the body panel 18. Of course, it will be apparent to those skilled in the art from this disclosure that the child seat tether anchor structure 12 can be attached to the body panel 18 of the vehicle body 14 using other fastening techniques.

As seen in FIG. 5–8, the height adjustment arrangement 26 is operatively arranged between the first tether anchor 21 and the vehicle body mounting member 25 to selectively retain the first tether anchor 21 in at least one of a first position relative to the vehicle body mounting member 25 and a second position relative to the vehicle body mounting member 25.

The height adjustment arrangement 26 basically includes a first height adjustment portion 61 and a second height adjustment portion 62. The first and second height adjustment portions 61 and 62 are threadedly coupled together. The first height adjustment portion 61 is fixedly coupled to the first tether anchor 21. The second height adjustment portion 62 is fixedly coupled to the vehicle body mounting member 25 of the vehicle body mounting member 25.

Basically, the first height adjustment portion 61 includes a rigid attachment member 63 and a threaded member 64. The rigid attachment member 63 and the threaded member 64 are preferably fixedly coupled together as an integrated member. For example, the rigid attachment member 63 is welded to the threaded member 64. In the illustrated embodiment, an upper washer 65 is also welded to the shaft of the rigid attachment member 63 and to the upper end of the threaded member 64.

The rigid attachment member 63 is preferably constructed of a hard metallic material. The rigid attachment member 63 is coupled at its upper end 63a to the first tether anchor 21 and coupled at its lower end 63b to the intermediate tether anchor 23. Specifically, the upper end 63a of the rigid attachment member 63 has external threads for threadedly receiving a wing nut 66. The first tether anchor 21 is attached to the upper end 63a of the rigid attachment member 63 by placing the first tether anchor 21 over the upper end 63a of the rigid attachment member 63 such that the upper end 63a of the rigid attachment member 63 is received in the mounting hole 34a of the first tether anchor 21 and the first tether anchor 21 abut against the washer 65. Then, the wing nut 66 is threaded onto the upper end 63a of the rigid attachment member 63 to secure the first tether anchor 21 to the upper end 63a of the rigid attachment member 63.

The lower end 63b of the rigid attachment member 63 has external threads for threadedly receiving a nut 68. Also, a washer 70 is fixedly coupled (e.g., welded) to the shaft of the rigid attachment member 63 at a location that axially spaced upwardly from the threads of the lower end 63b of the rigid attachment member 63. The intermediate tether anchor 23 is attached to the lower end 63b of the rigid attachment member 63 by placing the intermediate tether anchor 23 over the lower end 63b of the rigid attachment member 63 such that the lower end 63b of the rigid attachment member 63 is received in the mounting hole 44a of the intermediate tether anchor 23 and the intermediate tether anchor 23 abut against the washer 70. Then, the nut 68 is threaded onto the lower end 63b of the rigid attachment member 63 to secure the intermediate tether anchor 23 to the lower end 63b of the rigid attachment member 63.

The threaded member 64 is a tubular member with a longitudinally extending bore 64a and external threads 64b. The threaded member 64 is preferably constructed of a hard metallic material. The rigid attachment member 63 extends through the bore 64a of the threaded member 64. In other words, the upper end 63a of the rigid attachment member 63 is located above the threaded member 64, while the lower end 63b of the rigid attachment member 63 is located below the threaded member 64.

The second height adjustment portion 62 is a tubular member with a longitudinally extending bore 62a having internal threads 62b. The second height adjustment portion 62 is disposed in the center hole 25a of the vehicle body mounting member 25. Preferably, the vehicle body mounting member 25 is cemented to the second height adjustment portion 62 such that they function as a single unit. The second height adjustment portion 62 is preferably constructed of a hard metallic material. The internal threads 62b of the second height adjustment portion 62 are threadedly engaged with external threads 64b of the threaded member 64 of the first height adjustment portion 61. Accordingly, when the first height adjustment portion 61 is rotated relative to the second height adjustment portion 62, the effective height of the first tether anchor 21 is changed relative to the body panel 18.

Of course, it will be apparent to those skilled in the art from this disclosure that the height adjustment arrangement 26 can be eliminated if needed and/or desired. If the height adjustment arrangement 26 is eliminated, then the rigid attachment member 63 can be considered part of the vehicle body mounting member.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle child seat tether anchor structure comprising:
a first tether anchor;
a second tether anchor remotely coupled to the first tether anchor by an anchoring tether;
a vehicle body mounting member configured and arranged to be coupled to a vehicle body; and
a height adjustment arrangement having a first height adjustment portion fixedly coupled to the first tether anchor and a second height adjustment portion fixedly coupled to the vehicle body mounting member, the first and second height adjustment portions being configured and arranged to selectively retain the first tether anchor in at least one of a first position relative to the vehicle body mounting member and a second position relative to the vehicle body mounting member.

2. The vehicle child seat tether anchor structure according to claim 1, wherein
the first and second height adjustment portions are threadedly coupled together.

3. The vehicle child seat tether anchor structure according to claim 1, wherein
the first height adjustment portion has an upper end with the first tether anchor coupled thereto and a lower end with an intermediate tether anchor coupled thereto.

4. The vehicle child seat tether anchor structure according to claim 3, further comprising wherein
the second tether anchor is remotely coupled to the intermediate tether anchor by the anchoring tether.

5. The vehicle child seat tether anchor structure according to claim 4, wherein
the first and second height adjustment portions are threadedly coupled together.

6. The vehicle child seat tether anchor structure according to claim 5, wherein
the vehicle body mounting member includes a grommet with the second height adjustment portion disposed therein.

7. The vehicle child seat tether anchor structure according to claim 1, wherein
the vehicle body mounting member includes a grommet with the second height adjustment portion disposed therein.

8. The vehicle child seat tether anchor structure according to claim 7, wherein
the first and second height adjustment portions are threadedly coupled together.

9. The vehicle child seat tether anchor structure according to claim 1, wherein
the first height adjustment portion has an upper end with the first tether anchor releasably coupled thereto and a lower end with an intermediate tether anchor coupled thereto.

10. A vehicle child seat tether anchor structure comprising:
first tether anchor means for securing a first end of an anchoring tether thereto;
second tether anchor means for securing a second end of the anchoring tether thereto;
vehicle body mounting means for mounting the first tether anchor means to a vehicle body; and
height adjustment means for a selectively retaining the first tether anchor means in at least one of a first position relative to the vehicle body mounting means and a second position relative to the vehicle body mounting means.

11. A vehicle child seat tether anchor structure comprising:
a first tether anchor;
a vehicle body mounting member configured and arranged to be coupled to a vehicle body, the vehicle body mounting member being coupled to the first tether anchor; and
a second tether anchor remotely coupled to the first tether anchor by an anchoring tether, the second tether anchor being configured and arranged to be coupled to a vehicle support structure.

12. The vehicle child seat tether anchor structure according to claim 11, wherein
a height adjustment arrangement is operatively arranged between the first tether anchor and the vehicle body mounting member to selectively retain the first tether anchor in at least one of a first position relative to the vehicle body mounting member and a second position relative to the vehicle body mounting member.

13. The vehicle child seat tether anchor structure according to claim 11, wherein
the first tether anchor is releasably coupled relative to the vehicle body mounting member.

14. The vehicle child seat tether anchor structure according to claim 13, further comprising
an intermediate tether anchor coupled relative to the vehicle body mounting member, with the anchoring tether being coupled between the intermediate tether anchor and the second tether anchor.

15. The vehicle child seat tether anchor structure according to claim 14, wherein
the first tether anchor and the intermediate tether anchor are coupled together by a rigid member.

16. The vehicle child seat tether anchor structure according to claim 11, further comprising
an intermediate tether anchor coupled to the first tether anchor by a rigid member, and the anchoring tether being coupled between the intermediate tether anchor and the second tether anchor.

17. A vehicle child seat tether anchor structure comprising:
first tether anchor means for attaching a child seat tether thereto;
vehicle body mounting means for mounting the first tether anchor means to a vehicle body; and
second tether anchor means for remotely securing to the first tether anchor to a support structure by an anchoring tether.

18. A vehicle structure comprising:
a vehicle body panel; and
a vehicle child seat tether anchor structure including
a tether anchor, and
a height adjustment arrangement having a first height adjustment portion configured to move in a direction perpendicular to the vehicle body panel fixedly coupled to the tether anchor and a second height adjustment portion fixedly coupled to the vehicle body panel, the first and second height adjustment portions being configured and arranged to selectively retain the tether anchor in at least one of a first position relative to the vehicle body panel and a second position relative to the vehicle body panel.

19. A vehicle structure comprising:
a vehicle body panel;
a vehicle support structure disposed beneath the vehicle body panel; and
a vehicle child seat tether anchor structure including
 a first tether anchor,
 a vehicle body mounting member coupled to the vehicle body, the vehicle body mounting member being coupled to the first tether anchor; and
 a second tether anchor remotely coupled to the first tether anchor by an anchoring tether, the second tether anchor being coupled to the vehicle support structure.

20. The vehicle structure according to claim 18, wherein the first height adjustment portion has a lower movement limit relative to the second height adjustment portion.

21. The vehicle structure according to claim 20, wherein the first tether anchor is dimensioned to contact the second height adjustment portion with the first height adjustment portion moved to a non-use position thereby providing the lower movement limit of the first height adjustment portion.

22. The vehicle structure according to claim 18, wherein the first height adjustment portion has an upper movement limit relative to the second height adjustment portion.

23. The vehicle structure according to claim 22, wherein the first height adjustment portion has a lower end with an intermediate tether anchor coupled thereto.

* * * * *